United States Patent [19]
Yoshii et al.

[11] Patent Number: 5,155,891
[45] Date of Patent: Oct. 20, 1992

[54] METHOD FOR ASSEMBLING A CAR

[75] Inventors: Noboru Yoshii; Narutoshi Omosako; Noriaki Ozaki; Yoshifumi Ito, all of Hiroshima, Japan

[73] Assignee: Mazda Motor Corporation, Hiroshima, Japan

[21] Appl. No.: 769,187

[22] Filed: Sep. 30, 1991

[30] Foreign Application Priority Data

| Sep. 28, 1990 | [JP] | Japan | 2-261397 |
| Sep. 29, 1990 | [JP] | Japan | 2-262233 |
| Mar. 27, 1991 | [JP] | Japan | 3-62795 |

[51] Int. Cl.⁵ .......................................... B21D 39/03
[52] U.S. Cl. ....................................... 29/430; 29/431
[58] Field of Search .................. 29/897.2, 429, 430, 29/431, 525.1, 783, 786, 791, 793, 799, 423

[56] References Cited

U.S. PATENT DOCUMENTS

| 2,955,870 | 10/1960 | Richards | 296/28 |
| 3,044,822 | 7/1962 | Dean et al. | 296/28 |
| 3,596,978 | 8/1971 | Wessells et al. | 296/28 |
| 4,353,430 | 10/1982 | Sjöqvist et al. | 180/90 |
| 4,391,465 | 7/1983 | Piano | 296/208 |
| 4,406,489 | 7/1981 | Trabert | 293/115 |
| 4,428,447 | 4/1982 | Malen | 180/68 |
| 4,542,934 | 2/1983 | Komatsu et al. | 296/194 |
| 4,597,461 | 7/1986 | Köchy et al. | 180/90 |
| 4,711,467 | 12/1987 | Link et al. | 29/430 X |
| 4,793,055 | 10/1986 | Shintani | 29/786 |
| 4,991,282 | 2/1991 | Konig | 29/430 X |
| 5,077,885 | 1/1992 | Kanemitsu | 29/430 |

FOREIGN PATENT DOCUMENTS

| 3149083 | 11/1987 | Fed. Rep. of Germany |
| 3726292 | 2/1989 | Fed. Rep. of Germany |
| 59-186780 | 10/1984 | Japan |
| 63-212184 | 9/1988 | Japan |
| 63-227479 | 9/1988 | Japan |

*Primary Examiner*—Timothy V. Eley
*Attorney, Agent, or Firm*—Thompson, Hine and Flory

[57] ABSTRACT

A method for fixing a nose unit having a shroud panel to the front portion of a car body. Shroud upper fixing brackets are temporarily attached to the shroud panel before various parts are mounted on the shroud panel so as to assemble the nose unit on a car assembly line. The brackets serve to fix the shroud panel to the car body. In the state of temporary attachment, the brackets are welded to the car body. Then, the shroud panel is removed from the brackets. The various parts are attached to the shroud panel so as to assemble the nose unit. The shroud panel of the nose unit is fastened to the brackets, so that the nose unit is fixed to the car body.

13 Claims, 14 Drawing Sheets

METHOD FOR ASSEMBLING A CAR

BACKGROUND OF THE INVENTION

The present invention relates to a method for assembling a car, and more particularly to a method for fixing a nose unit having a shroud panel to the front portion of a car body on a car assembly line.

Conventionally, the car such as an automobile has been assembled by the flow line operation on the car assembly line. A bumper, a radiator, a cooler condenser and the like are sequentially attached to the front portion of the car body in individual attachment stations provided in the middle of the car assembly line. Accordingly, there is caused a problem that the number of working stations is increased on the car assembly line so that the car assembly line has its overall length increased and is complicated.

Japanese Unexamined Patent Publication No. 63-103771 has disclosed a technique that parts such as a radiator, a head lamp, a bumper, a radiator grille and the like are attached to a radiator core support so as to be united, and the unit thus obtained is separately assembled and fixed to the front portion of the car body so that the overall length of the car assembly line is controlled.

The front portion of the car body is provided with wheel aprons for forming the side walls of an engine room. Front side frames and apron reinforcements are bonded to the underside and upside of the wheel aprons, respectively. A shroud panel is provided between the apron reinforcements. A cross member is provided between the front side frames. In the case where the parts to be fixed to the front portion of the car body are to be untied, the shroud panel functions as a unit component. In addition, the cross member also functions as the unit component, if necessary. The parts such as the radiator and the like are incorporated in the unit components so that a nose unit can be formed. Before the nose unit is fixed to the car body, therefore, it is necessary to attach by welding or the like any member (for example, a bracket) for mounting the shroud panel to the car body when fixing the nose unit thereto.

However, the above-mentioned members cannot independently and precisely be fixed in the predetermined positions of the car body because there are no means for defining, i.e., determining the positions in which the members are attached to the car body. If the nose unit is fixed to the car body, therefore, the adjustment of the parts on the nose unit and car body sides is damaged. Consequently, there is lowered the precision in attachment of the parts on the nose unit side to the car body. Thus, when the precision in attachment is lowered, the stiffness of the car body cannot be ensured. In addition, there is a possibility that a gap or the like is generated on the outer face of the car body.

SUMMARY OF THE INVENTION

It is an object of the present invention to provide a method for assembling a car wherein a nose unit is formed by separately uniting parts to be attached to the front portion of the car body, the nose unit is fixed to the car body, and there can be improved the precision is attachment of fixing means for fixing the nose unit (specifically, a shroud panel) to the car body and the precision in fixation of the nose unit. It is another object of the present invention to provide a method for fixing the nose unit having the shroud panel to the car body which is to be delivered along a car assembly line and has wheel apron reinforcements, wheel aprons, wheel apron gussets and front side frames in its front portion forming an engine room.

To achieve the above-mentioned objects, the fixing means for fixing the shroud panel to the car body is temporarily attached to the shroud panel before various parts are mounted on the shroud panel so as to assemble the nose unit. In this state, the fixing means is attached to the car body. Then, the shroud panel is removed from the fixing means and the various parts are attached to the shroud panel so as to assemble the nose unit. The shroud panel of the nose unit is fastened to the fixing means so as to fix the nose unit to the car body. In this case, the fixing means is attached to the car body in consideration of the mounting of the various parts. Then, the shroud panel is removed from the fixing means with being positioned by a positioning member. The fixing means has brackets to be welded to the car body, for example. The shroud panel has a shroud upper extended to both sides of the car body. Both end portions of the shroud upper are fastened to the brackets. In that case, the bracket has a base and an upper fastening portion. The base is welded to the wheel apron reinforcements, wheel apron and wheel apron gusset. The upper fastening portion is protruded from the base onto the engine room side.

The fixing means is mounted on the front portion of the car body with being temporarily attached to the shroud panel on the nose unit side. Consequently, the positional relationship between the fixing means and the shroud panel is precisely regulated, so that the fixing means can be mounted on the car body with high precision. Accordingly, the precision in mounting of the fixing means is enhanced. Thus, the shroud panel can be fastened to the fixing means with high precision when fixing the nose unit to the car body, so that the adjustment of the parts on the car body and nose unit sides can be ensured. Consequently, there can be obtained high precision in attachment. In addition, the suitable stiffness for the car body can be ensured. As a result, it is possible to prevent a gap or the like from being generated on the outer face of the car body owing to no adjustment.

The apron reinforcements have engagement portions on the rearer side of the car body than the welding positions of the brackets. A bar is engaged with the engagement portions. The bar serves to prevent the front portion of the car body from being deformed when fixing the nose unit thereto. The engagement portions are fixed to the apron reinforcements so as to be protruded onto the engine room side. Consequently, even if the front side frames are not connected to each other by the cross member, the stiffness of the front portion of the car body can be ensured. Thus, the nose unit can be fixed to the car body with high precision.

The shroud panel includes a shroud upper and a stay. The shroud upper has first engagement holes. The stay is extended downward from the shroud upper and has a second engagement hole. The lower portion of the stay is positioned by a positioning member so as to hold a normal position with respect to the shroud upper. In this state, various parts are attached to the shroud panel. In addition, the shroud panel includes shroud side panels. The shroud side panels are provided on both sides of the stay, are vertically extended downward from the shroud upper and have third engagement holes. Radiator support brackets are fixed to the lower end portions of the shroud side panels. The radiator support brackets serve to support the lower portions of the radiator and cooler condenser as parts.

The positioning member is a rectangular frame, and has engagement pins on its upper and lower portions respectively. The upper engagement pins are respectively engaged with the first engagement holes of the shroud upper. The lower engagement pins are engaged respectively with the second and third engagement holes of the lower end portions of the stay and shroud side panels.

The shroud panel has a shroud upper, a stay and shroud side panels. The stay is extended downward from the shroud upper. The shroud side panels are provided on both sides of the stay and are vertically extended downward from the shroud upper. The cross member can be fixed to the lower end portions of the stay and shroud side panels. The side and portions of the cross member are fastened to the front side frames. In this case, the radiator support brackets are fixed to the cross member. The radiator support brackets serve to support the lower portion of the radiator as a part.

In the state where the various parts are attached and positioned by the positioning member, the lower portion of the stay is fixed to the member on the car body side. The member on the car body side is a cross member which is provided between the tip portions of the front side frames, for example.

In the case where the car body has the cross member extended to it both sides and provided between the front side frames, the fixing means is mounted on the car body with the shroud panel temporarily fastened to the cross member in order to increase the precision in mounting of the fixing means.

These and other objects, features and advantages of the present invention will become more apparent upon a reading of the following detailed description and drawings.

DETAILED DESCRIPTION OF THE PREFERRED EMBODIMENTS

Preferred embodiments of the present invention will be described in more detail with reference to the drawings.

Figure 1:
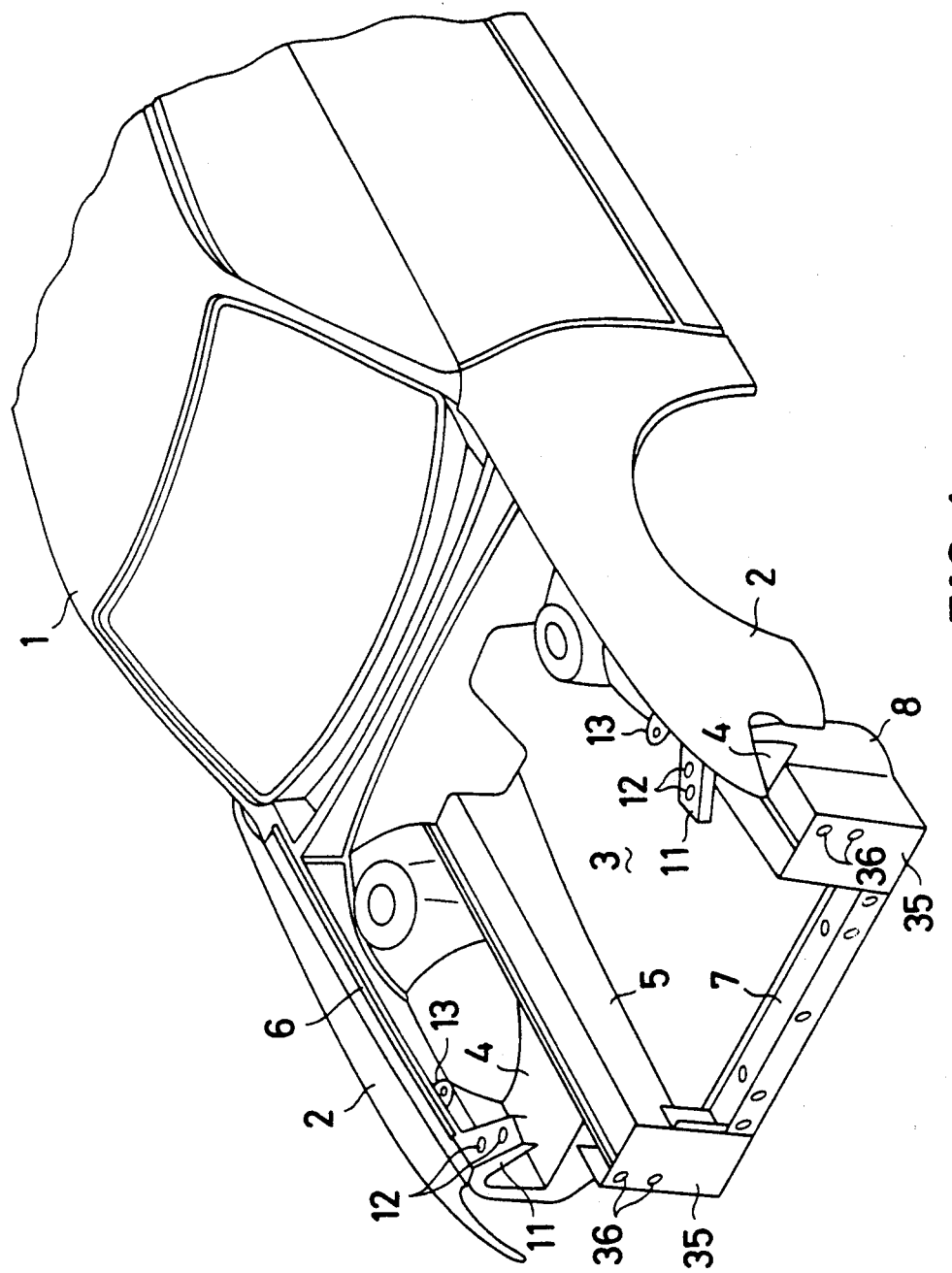
FIG. 1 is a perspective view of the front portion of a car body before fixing a nose unit thereto.

FIG. 1 shows a car body to which the present invention is applied. In FIG. 1, the car body is indicated at 1, front fenders are indicated at 2, and an engine room is indicated at 3. At 4 are indicated wheel aprons forming the side walls of the engine room 3. Front side frames 5 and apron reinforcements 6 are respectively provided on the underside and upside of the wheel aprons 4. A cross member 7 is provided between the tip portions of the front side frames 5. The cross member 7 is extended to both sides of the car body 1. Wheel apron gussets 8 are fixed to the front side frames 5 and the cross member 7. They are precisely positioned and welded to one another on a first main line C to be described below.

Shroud upper fixing brackets 11 are protruded onto the engine room 3 side, i.e., the inside of the car body 1, and are welded to the front end portions of the apron reinforcements 6. Both end portions of a shroud panel 10 (shroud upper 10a) forming a nose unit 9 are fastened to the brackets 11.

Figure 2:
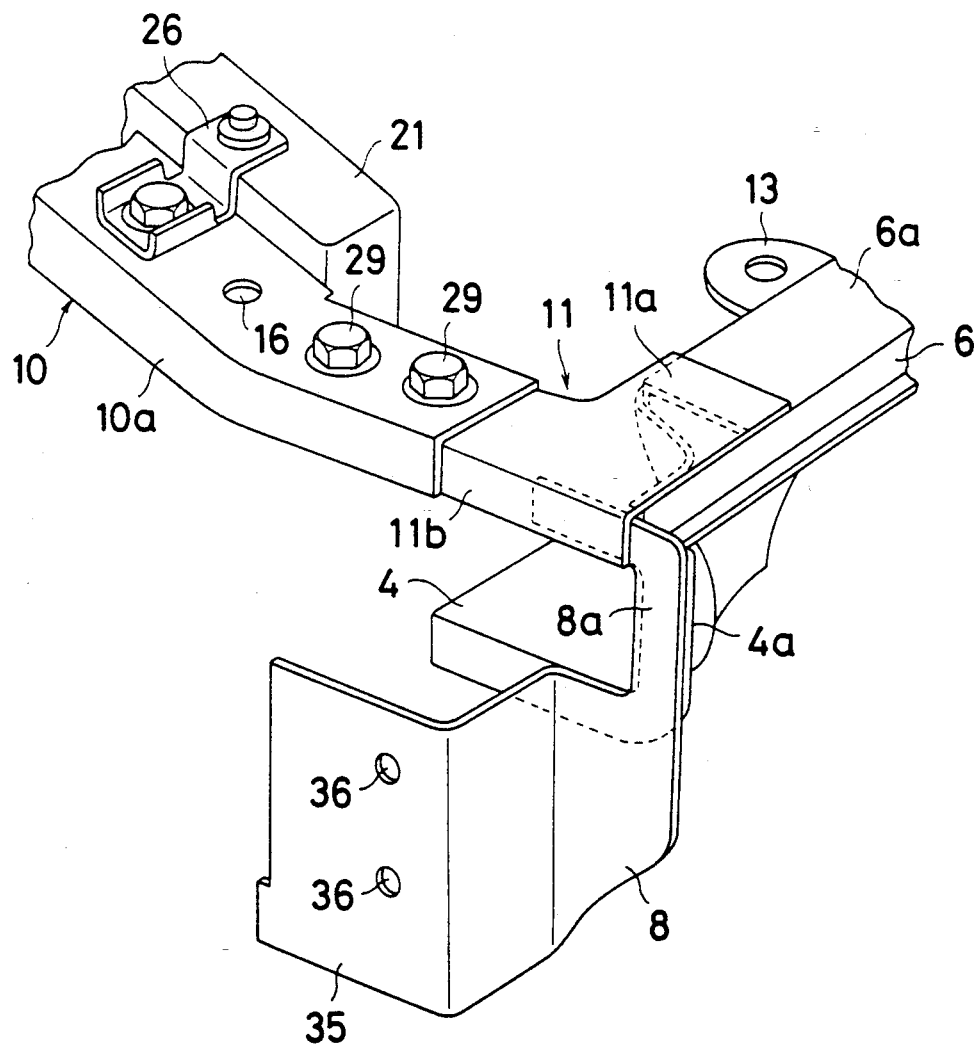
FIG. 2 is an enlarged perspective view of the shroud upper fastening portion of the nose unit.

As shown in FIG. 2, the bracket 11 has a base 11a welded to the wheel apron reinforcement 6, wheel apron 4 and wheel apron gusset 8. The base 11a has an upper fastening portion 11b protruded onto the engine room 3 side. The upper fastening portion 11b has an almost L-shaped cross section downward. The upper fastening portion 11b has bolt insertion holes 12. Nuts (not shown) are fixed onto the lower face side of the upper fastening portion 11b correspondingly to the bolt insertion holes 12.

Engagement portions 13 are fixed to the apron reinforcements 6 so as to be protruded onto the engine room 3 side in slightly rearer portions of the car body than the fixing positions of the brackets 11. The engagement portions 13 have engagement holes. The engagement portions 13 are provided for fixing a bar 14. The bar 14 serves to prevent the front portion of the car body from being deformed when fixing the nose unit thereto.

Figure 3:
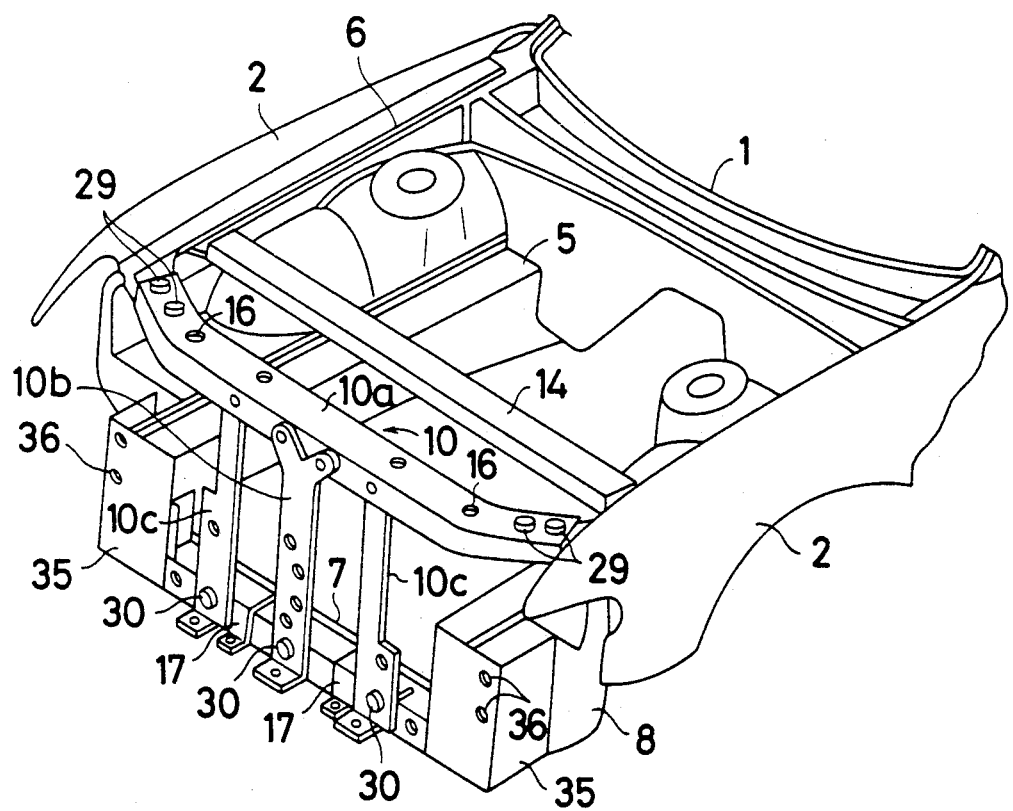
FIG. 3 is a perspective view of the front portion of the car body to which the shroud panel is temporarily attached.

As shown in FIG. 3, the shroud panel 10 has the shroud upper 10a. The shroud upper 10a has an almost L-shaped cross section downward and is extended to both sides of the car body 1. Both end portions of the shroud upper 10a can be fitted in the brackets 11 and have bolt insertion holes (not shown) correspondingly to the bolt insertion holes 12 on the bracket 11 sides. Engagement holes 16 are formed in the inner portions of the bolt insertion holes 12. The engagement holes 16 are provided for attaching a nose unit fixing member 15. The upper end portion of a center stay 10b is fixed to almost the lateral center portion of the shroud upper 10a. The center stay 10b is vertically suspended downward. The upper end portions of shroud side panels 10c are fixed onto both sides of the center stay 10b. The shroud side panels 10c are vertically suspended downward. Consequently, the shroud panel 10 is formed. Radiator support brackets 17 are fixed to the lower end portions of the shroud side panels 10c.

Figure 4:
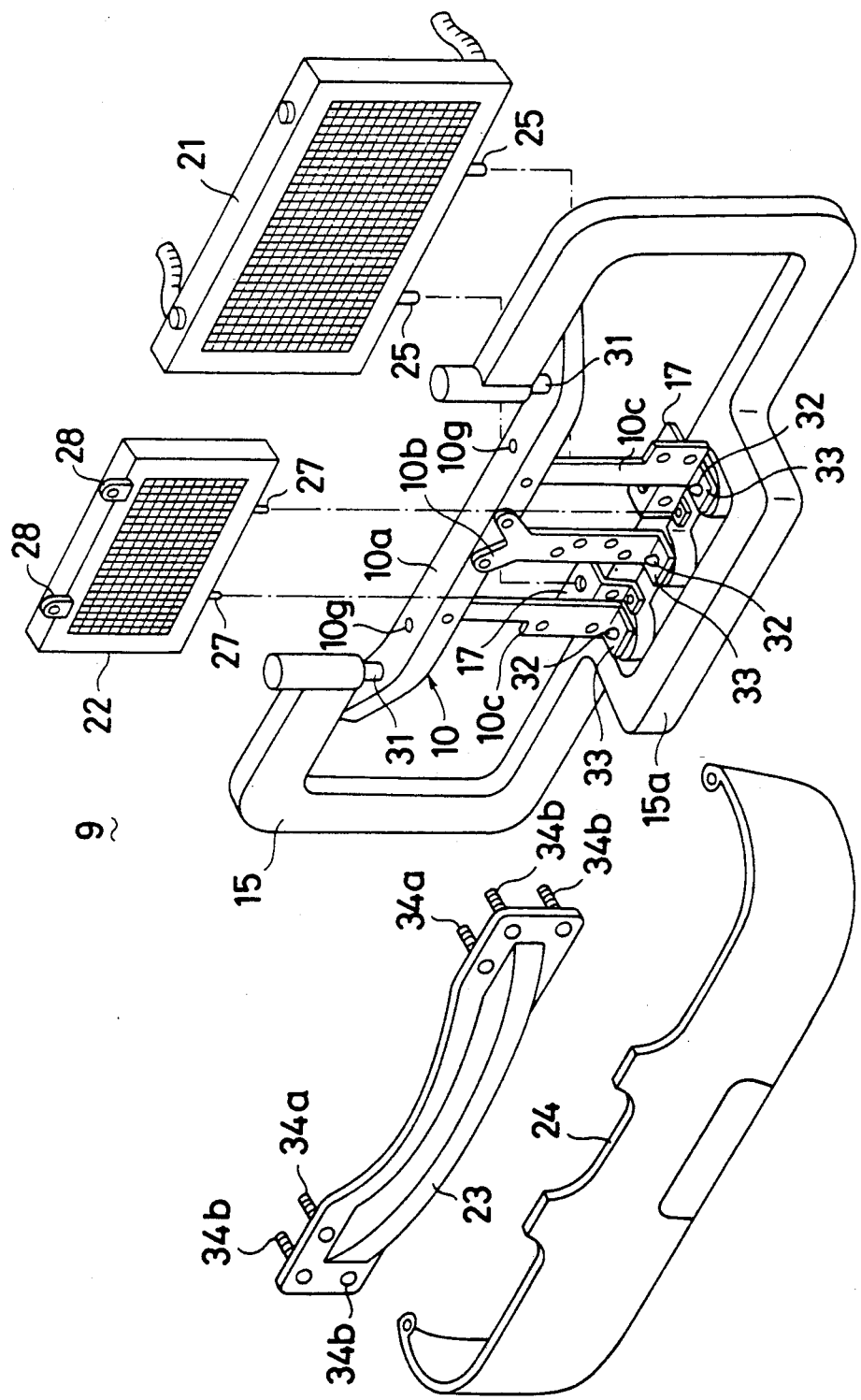
FIG. 4 is an exploded view of the nose unit.

As shown in FIG. 4, a radiator 21, a cooler condenser 22, a bumper reinforcement 23 and a bumper 24 are attached to the shroud panel 10. Consequently, there can be formed the nose unit 9 to be fixed to the front portion of the car body 1. Pins 25 are engaged with the radiator support brackets 17 provided on the shroud panel 10. The pins 25 are protruded to the lower end portion of the radiator 21. The upper end portion of the radiator 21 is connected to the shroud upper 10a through connecting members 26 (see FIG. 2). Thus, the radiator 21 is attached to the shroud panel 10. Pins 27 are engaged with the radiator support brackets 17. The pins 27 are protruded to the lower end portion of the cooler condenser 22. The upper end portion of the cooler condenser 22 is connected to the shroud upper 10a through connecting members 28. Thus, the cooler condenser 22 is attached to the shroud panel 10. The bumper reinforcement 23 and bumper 24 are fastened to the shroud side panels 10c through bolts 34 and nuts (not shown) by using the openings formed on the shroud side panels 10c. The bolts 34 are protruded from the bumper reinforcement 23. The above-mentioned structure is one of examples, and is not particularly limited. FIG. 4 shows only the main parts forming the nose unit 9. Other parts such as a cooler receiver tank, a bonnet lock and the like are attached to the shroud panel 10.

There will be described a method for assembling a car.

Figure 5:
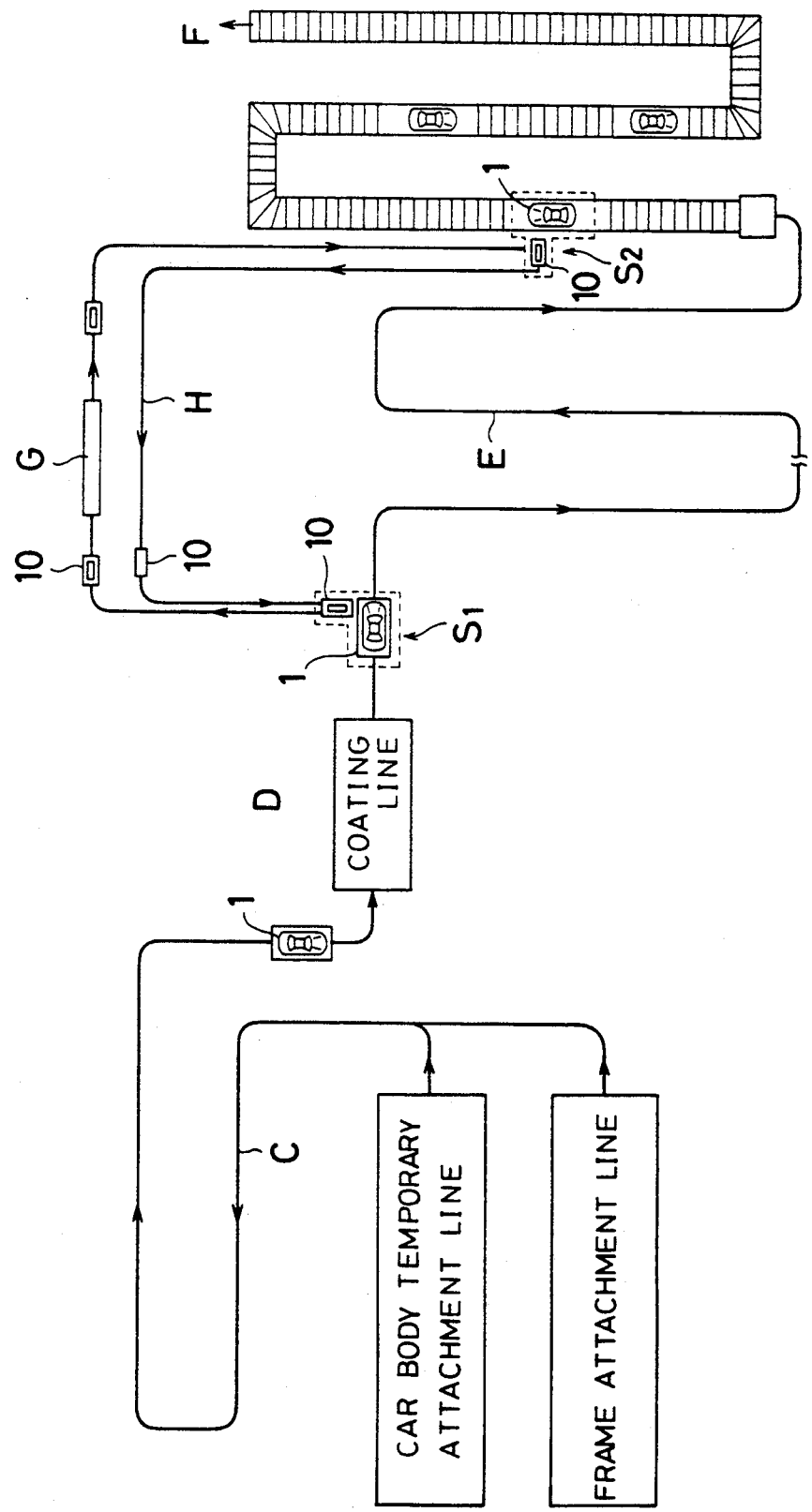
FIG. 5 is a schematic view of a car assembly line.
Figure 6:
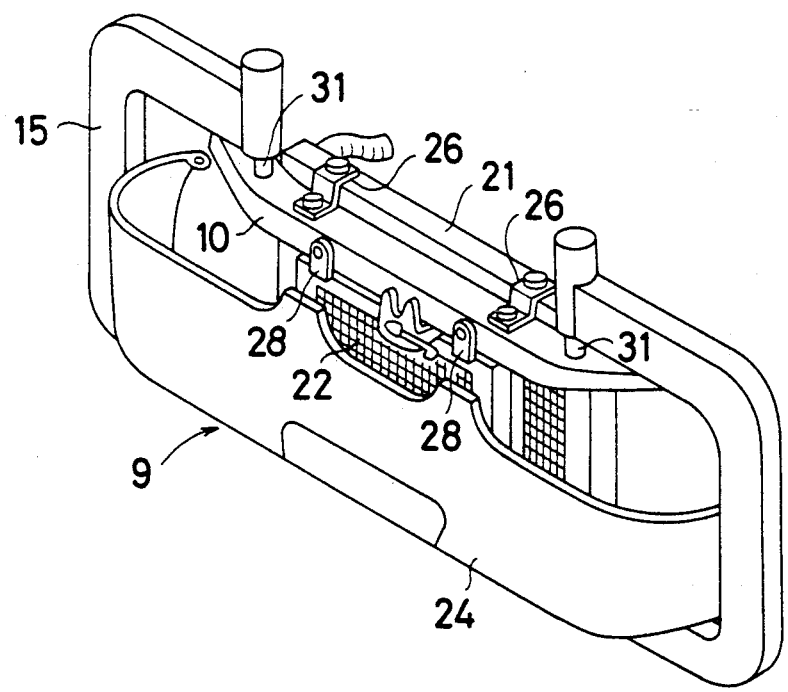
FIG. 6 is an erection view of the nose unit.

As shown in FIG. 5, parts are sent out of a car body temporary attachment line A and a frame attachment line B, and are connected to each other on the first main line C. Each portion of the car body is subjected to predetermined welding along the first main line C. Consequently, the car body 1 can be formed as shown in FIG. 1. In FIG. 1, the structure of the front portion of the car body 1 is clearly displayed by removing the shroud panel 10.

Then, the car body 1 is delivered into a coating line D. The car body 1 thus coated is subjected to predetermined steps such as suspension attachment and the like on a second main line E. Consequently, an entire car is transmitted in the direction of an arrow F.

In that case, the both end portions of the shroud upper 10a are fitted in the upper fastening portions 11b of the brackets 11 from above on the car body temporary attachment line A. Fastening bolts 29 are inserted in bolt insertion holes (not shown) on the shroud upper 10a side and the bolt insertion holes 12 of the brackets 11, and then are engaged with the nuts welded to the lower faces of the brackets 11. Consequently, the brackets 11 are temporarily attached to the shroud panel 10.

In that state, the brackets 11 are applied to the front end portions of the apron reinforcements 6. At this time, the lower end portions of the center stay 10b and shroud side panels 10c are temporarily attached to the cross member 7 through fastening bolts 30. The radiator support brackets 17 are engaged with and seated on the upside of the cross member 7. Consequently, the shroud panel 10 is positioned. The temporary attachment is carried out through the fastening bolts 30 in the state where the bar 14 is provided between the engagement portions 13 on the apron reinforcements 6 so as to prevent the side walls forming both sides of the engine room 3 from being expanded.

In the state of temporary attachment, the respective spaces between the apron reinforcements 6 and between the front sides frames 5 are controlled to become constant by the shroud upper 10a and the cross member 7. In addition, the wheel aprons 4 are also positioned. In this state, each portion of the car body 1 is subjected to welding. The brackets 11 are also welded to the car body 1.

Thus, the base 11a of the bracket 11 is fixed to the upper face 6a of the apron reinforcement 6 and the side face of the wheel apron 4. The wheel apron 4 is provided on the engine room 3 side of the apron reinforcement 6.

The wheel apron gusset 8 is fixed to the front side frame 5 and the cross member 7 side, and has a flange 8a extended upward. The flange 8a is inserted in and welded to the base 11a. In addition, a flange 4a of the wheel apron 4 on the front side of the car body 1 is welded to the flange 8a. Accordingly, the wheel apron 4, apron reinforcement 6 and wheel apron gusset 8 are welded to one another. The bracket 11 is bonded to the wheel apron 4, apron reinforcement 6 and wheel apron gusset 8. The above-mentioned welding structure is one of examples, and is not particularly limited.

In the state where the brackets 11 are temporarily attached to the shroud panel 10 and the shroud panel 10 is temporarily fastened to the cross member 7, the brackets 11 are welded to the car body 1. Then, the car body 1 is delivered along the coating line D. After the car body 1 gets out of the coating line D, the shroud panel 10 is removed from the car body 1 in a station S1 which is provided on the inlet of the second main line E.

In order to assemble the nose unit, the shroud panel 10 is removed from the car body 1 by using the nose unit fixing member 15 shown in FIG. 4.

The nose unit fixing member 15 is a rectangular frame, and has engagement pins 31 and a support portion 15a on its upper and lower portions. The engagement pins 31 are engaged with the engagement holes 16 formed on the shroud upper 10a. The support portion 15a receives and supports the shroud upper 10a, and has engagement pins 32. The engagement pins 32 are engaged with engagement portions 33. The engagement portions 33 are provided on the lower end portions of the center stay 10b and shroud side panels 10c of the shroud panel 10.

The engagement pins 31 and 32 are engaged with the engagement holes 16 and engagement portions 33 respectively, so that the shroud panel 10 is held by the nose unit fixing member 15. In this state, the shroud upper 10a is released from the brackets 11, and the center stay 10b and shroud side panels 10c are released from the cross member 7.

Thus, the shroud panel 10 is removed from the car body 1 and is held by the nose unit fixing member 15. As shown in FIG. 4, various parts such as the radiator 21, the cooler condenser 22, the bumper reinforcement 23, the bumper 24 and the like are attached to the shroud panel 10 so as to assemble the nose unit 9 on a nose unit assembly line G. Thus, the various parts are attached to shroud panel 10 held by the nose unit fixing member 15 such that the center stay 10b and shroud side panels 10c are precisely positioned with respect to the shroud upper 10a. In FIG. 4, at 10g are indicated bolt insertion holes for attaching the radiator 21 to the shroud panel 10, at 34a are indicated bolts for fastening the bumper reinforcement 23 to the shroud side panels 10c, and at 34b are indicated bolts for fastening the bumper reinforcement 23 to bolt insertion holes 36 on a cross member side 35.

Figure 7:
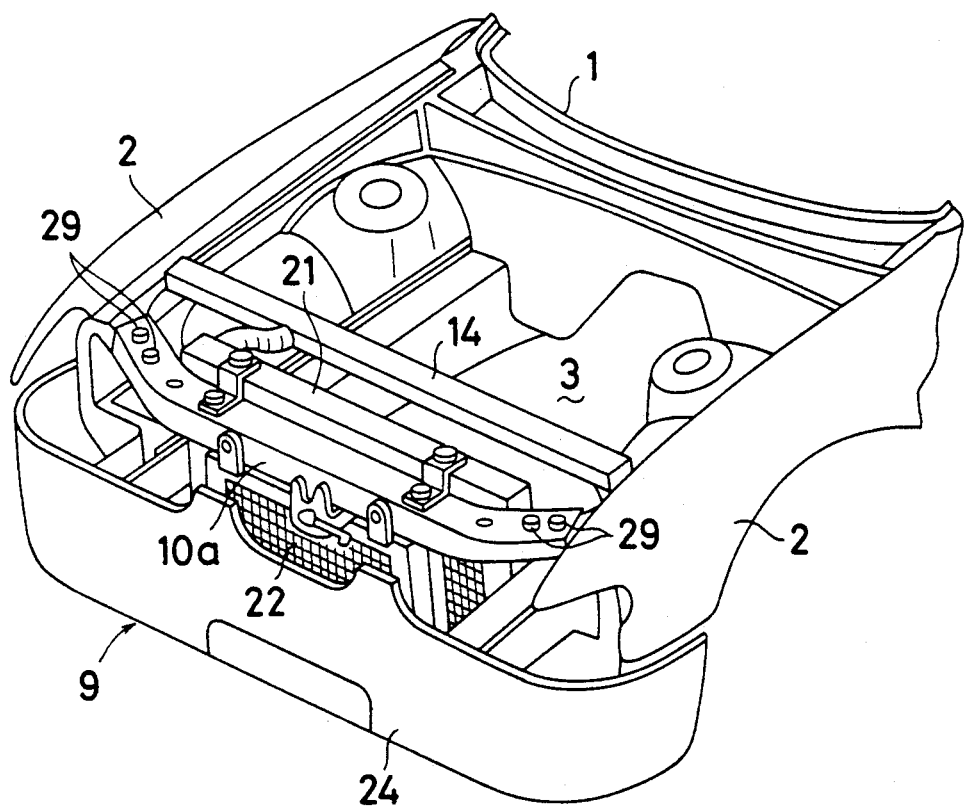
FIG. 7 is a perspective view of the front portion of the car body to which the nose unit is fixed.

The nose unit 9 thus assembled is transmitted to a nose unit fixing station S2 shown in FIG. 5. On the other hand, the car body 1 is delivered along the second main line E, and is subjected to necessary working for attaching various parts such as a suspension and the like. The nose unit 9 is fixed to the car body 1 in the nose unit fixing station S2 provided in the middle of the second main line E (see FIG. 7). The nose unit fixing member 15 is returned to a shroud panel removing station S1 along a member return line H.

In similar to the temporary attachment shown in FIG. 3, the nose unit 9 is fixed to the car body 1. More specifically, the shroud upper 10a is fastened to the brackets 11 through the bolts 31 (see FIG. 7). The shroud side panels 10c are fastened to the cross member 7 through bolts with the radiator support brackets 17 engaged with the cross member 7. The bumper reinforcement 23 is fastened to the wheel apron gussets 8 through the bolts 34 by using the bolt insertion holes 36 on the first cross member sides 35. The first cross member sides 35 are integrated with the wheel apron gussets 8. Then, there are attached to the car body 1 other parts such as radiator grille, a head lamp and the like (not shown).

With the above-mentioned structure, the shroud upper 10a of the shroud panel 10 forming the nose unit 9 is temporarily attached to the brackets 11 through the bolts 29. Then, the brackets 11 are welded to the car body 1 with the shroud panel 10 temporarily attached to the cross member 7 through the bolts 30. Consequently, the brackets 11 are precisely positioned and welded to the car body 1. In addition, welding is carried out with the positional relationship between the brackets 11 and the shroud panel 10 (and nose unit 9) regulated, so that the precision in welding is improved. Accordingly, there can be enhanced the precision in fixation of the nose unit 9 to the car body 1. Consequently, the stiffness of the car body can be increased. In addition, it is possible to prevent a gap of the like from being generated on the outer face of the car body 1.

Figure 8:
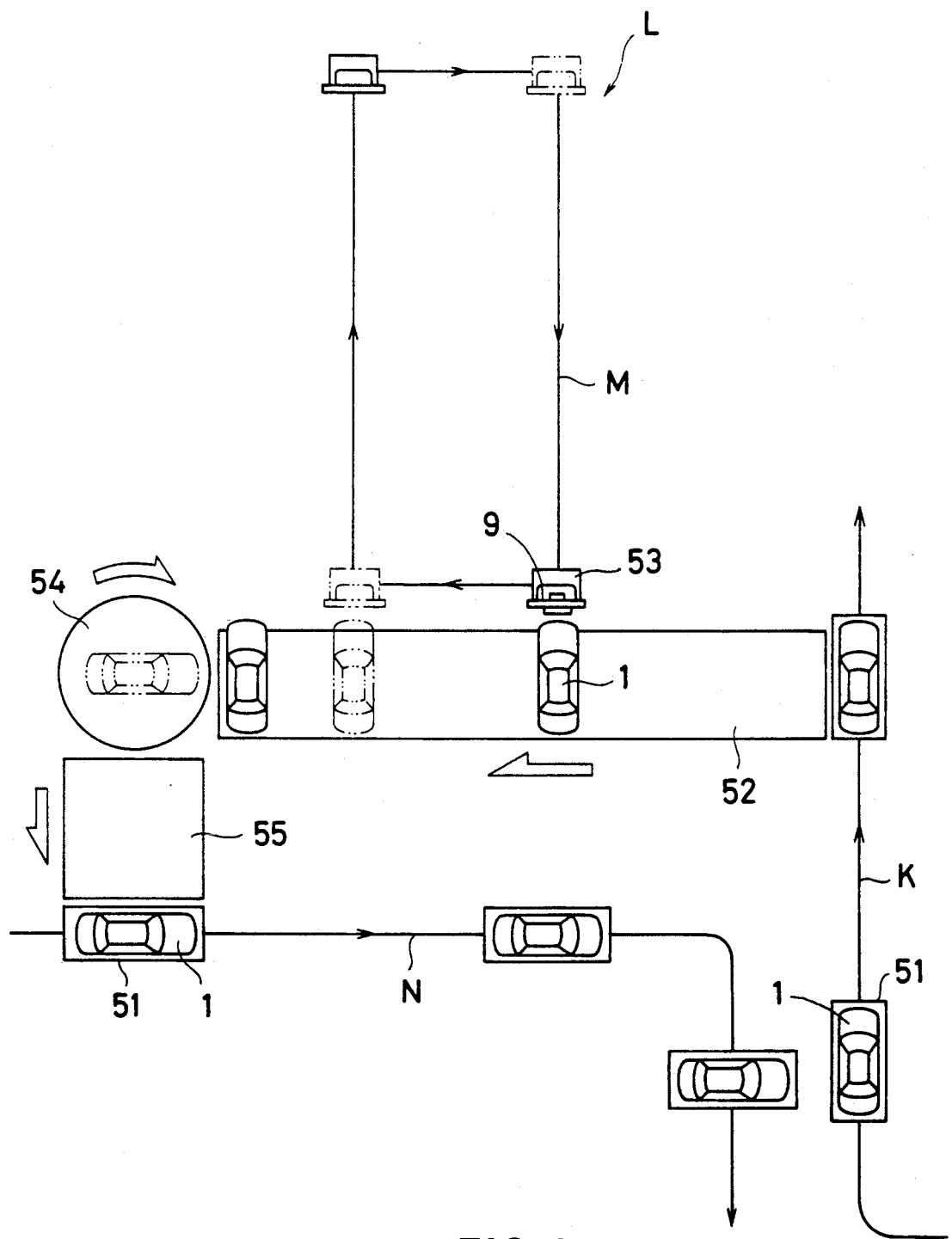
FIG. 8 is a view showing another embodiment of the present invention correspondingly to FIG. 5.

The present invention can also be applied to a car assembly line shown in FIG. 8.

A car body 1 is assembled along a line K by predetermined delivery means 51. The car body 1 thus assembled is delivered to the nose unit assembly station L side by a delivery conveyer 52. A nose unit 9 is assembled in a nose unit assembly station L while the car body 1 is delivered by the delivery conveyer 52. The nose unit 9 is transferred along a predetermined passage M by transfer means 53 such as a truck. Then, the nose unit 9 is fixed to the car body 1. Thereafter, the car body 1 having the nose unit 9 changes in course by a turntable 54, and is received by the predetermined delivery means 51 through a delivery conveyer 55. The car body 1 is delivered along a line N again, and then assembly is carried out.

Figure 9:
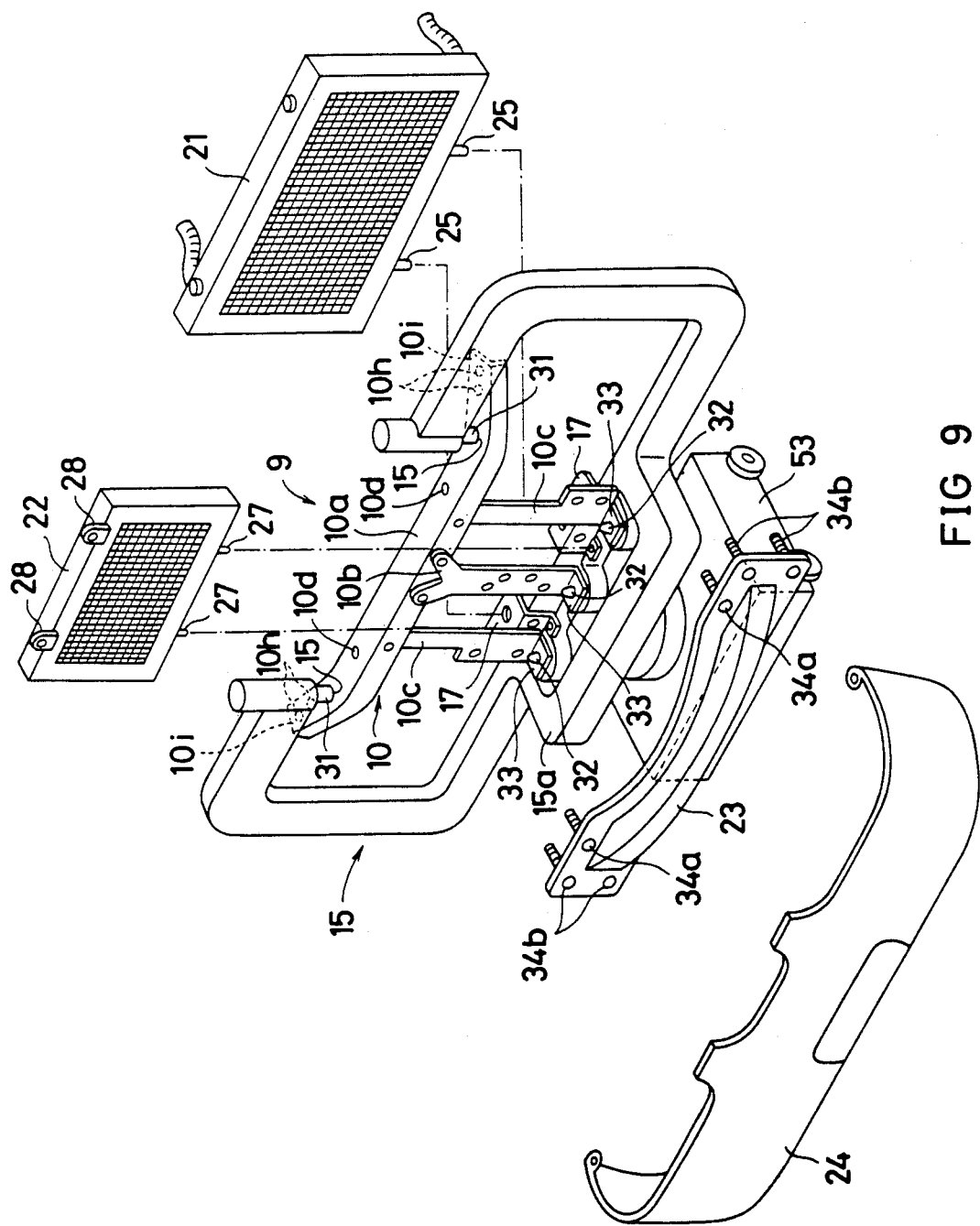
FIG. 9 is a view showing the embodiment of the present invention correspondingly to FIG. 4.

The car body 1 is delivered to the nose unit assembly station L side as follows. While the car body 1 is delivered along a car assembly line, wheel aprons 4 are attached to the inside of front fenders 2. The wheel aprons 4 form the inside faces of an engine room 2. In addition, a pair of front side frames 5 are provided on the underside of the wheel aprons 4. The front side frames 5 are extended in the longitudinal direction of the car body 1 and take the form of a closed cross section. Furthermore, apron reinforcements 6 (one of them is shown) are provided on the upside of the wheel aprons 4. The apron reinforcements 6 are extended in the longitudinal direction of the car body 1. A cross member 7 is provided between the tip portions of the front side frames 5. The cross member 7 is extended in the direction of a car width and takes the form of the closed cross section. Wheel apron gussets 8 are provided from the junctions of the front side frames 5 and cross member 7 to the front end portions of the front wheel aprons 4. They are precisely positioned, and are welded and integrated with one another. In FIG. 9, at 10b are indicated bolt insertion holes for fastening end portions 10i of a shroud upper 10a to nose unit fixing brackets 11A.

The nose unit 9 is assembled in the nose unit assembly station L by attaching various parts such as a radiator and the like to be mounted on the front portion of the car body 1. The nose unit 9 thus assembled is fastened to the brackets 11A of the car body 1.

The various parts are attached to the nose unit 9 with the shroud upper 10a held by a member 15. Then, the nose unit 9 having the various parts is fixed to the car body 1.

Figure 10:
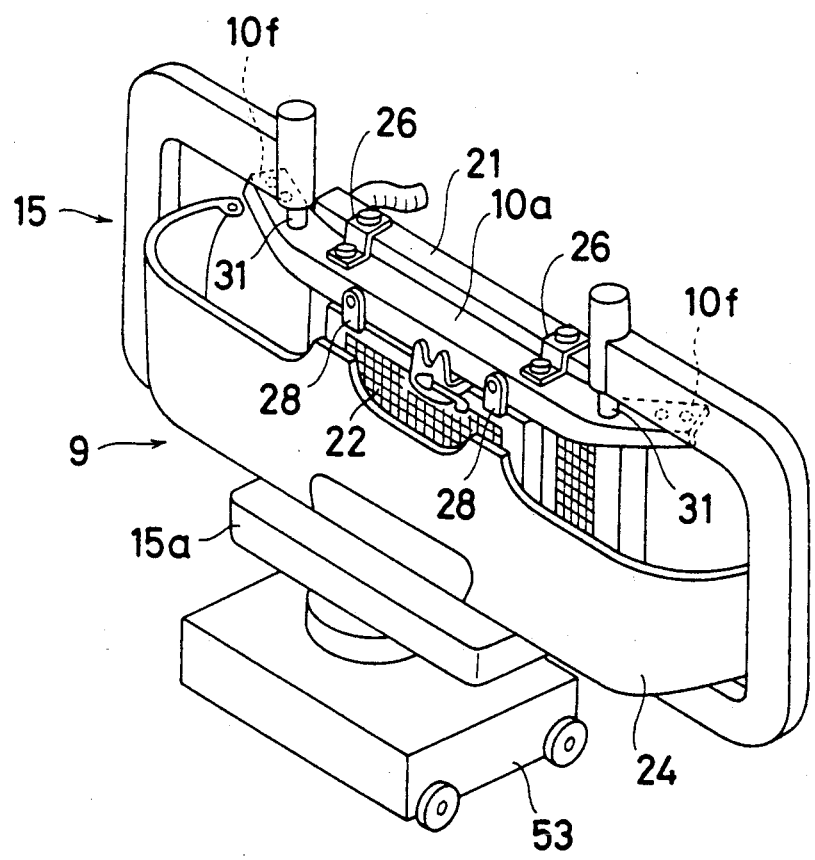
FIG. 10 is a view showing the embodiment of the present invention correspondingly to FIG. 6.
Figure 11:
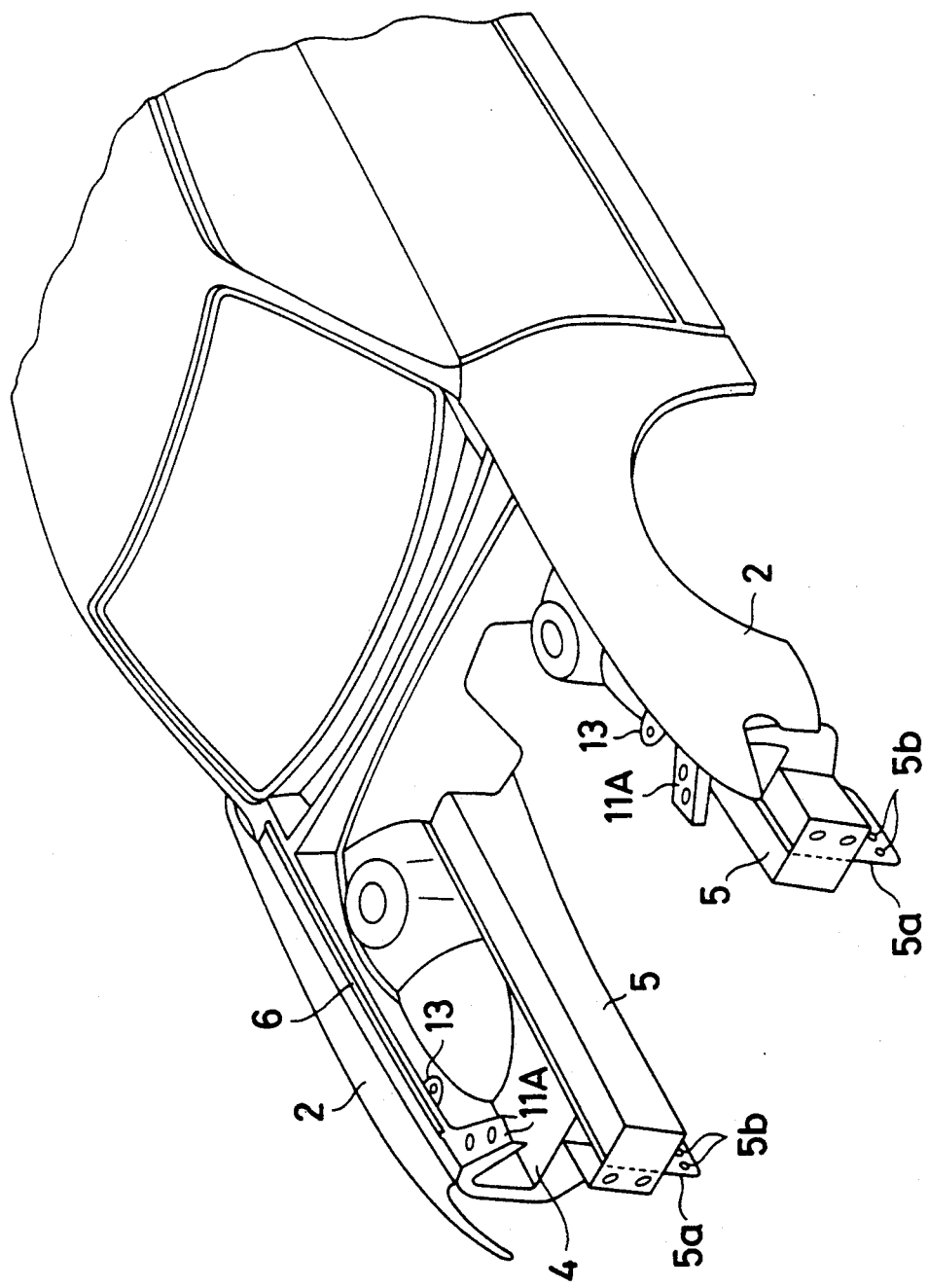
FIG. 11 is a view showing yet another embodiment of the present invention correspondingly to FIG. 1.
Figure 12:
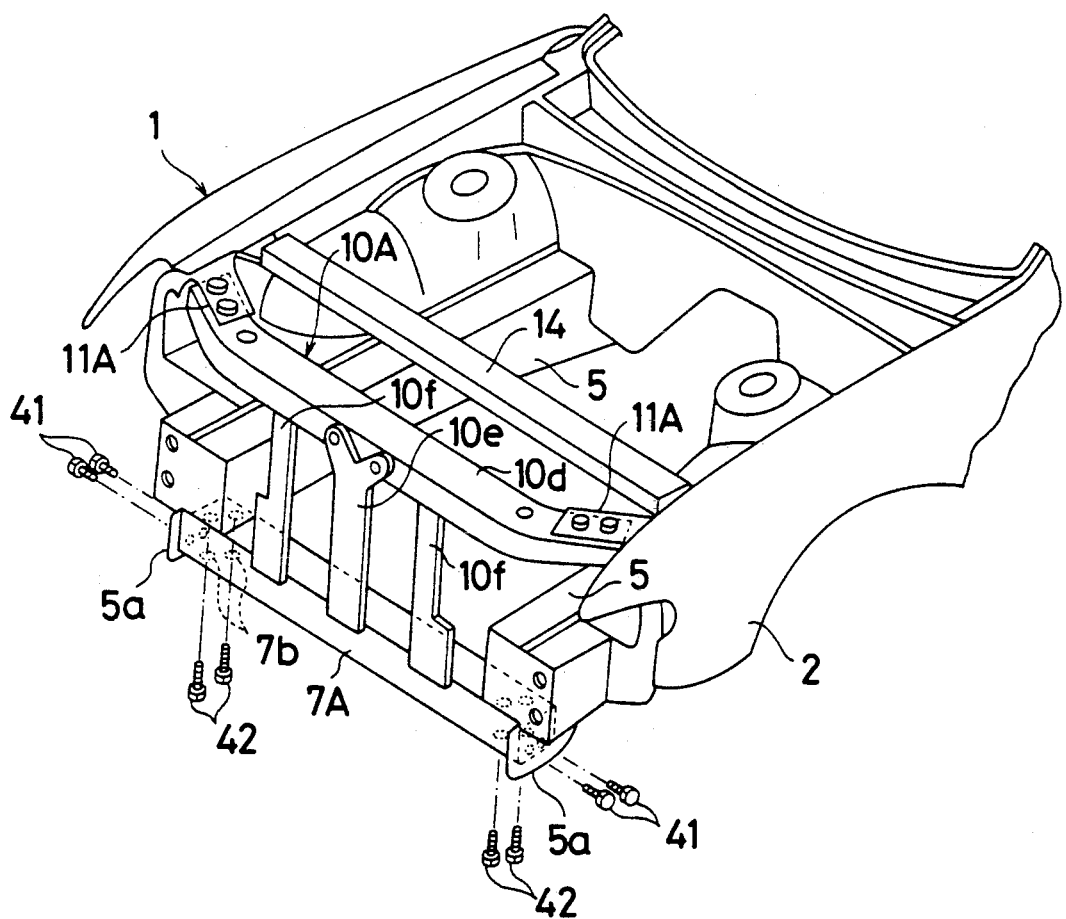
FIG. 12 is a view showing the embodiment of the present invention correspondingly to FIG. 3.
Figure 13:
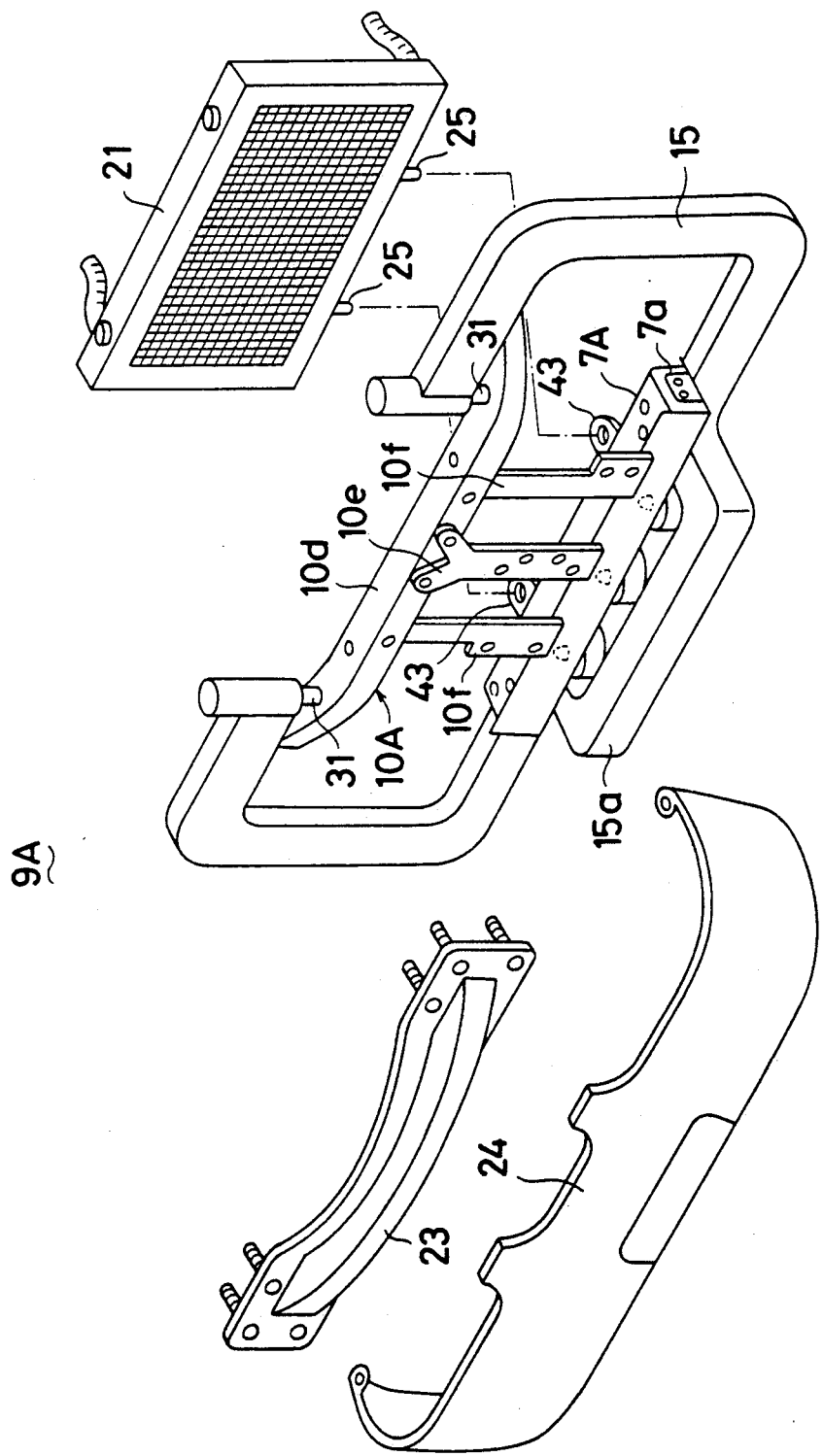
FIG. 13 is a view showing to the embodiment of the present invention correspondingly to FIG. 4.
Figure 14:
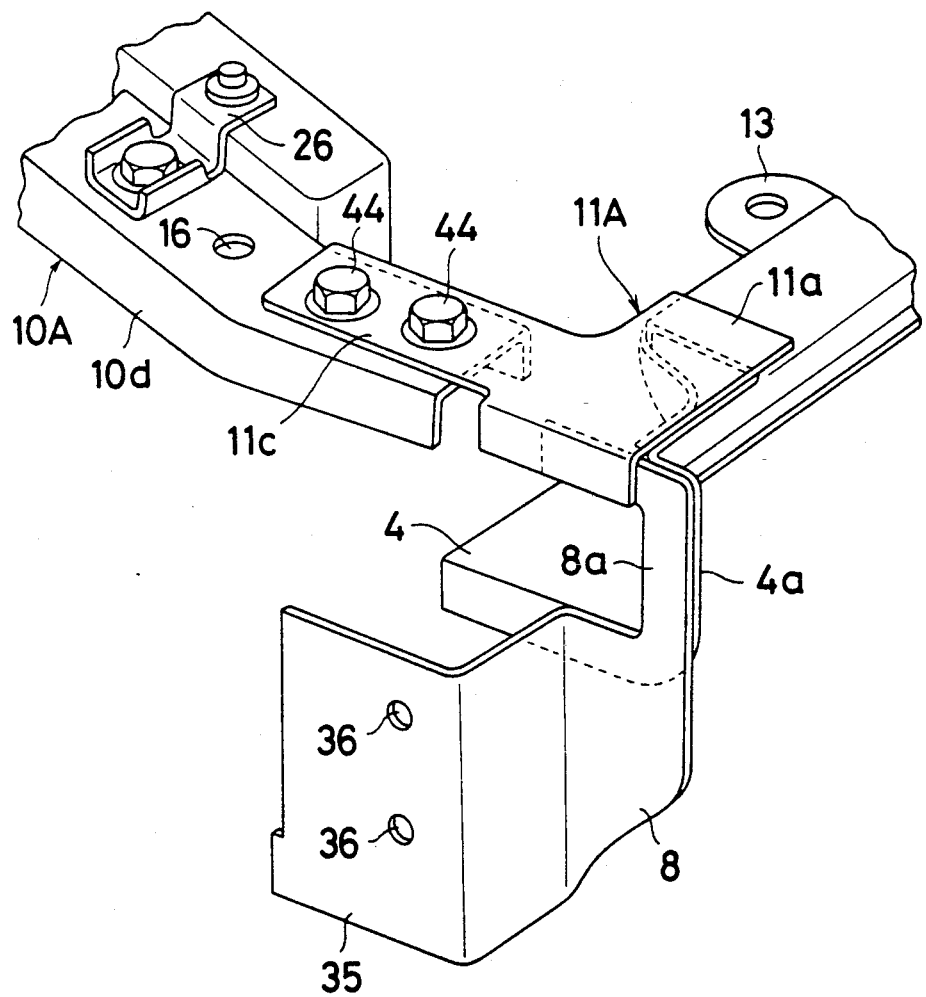
FIG. 14 is a view showing the embodiment of the present invention correspondingly to FIG. 2.

The nose unit 9 thus assembled is delivered along the delivery passage M by the truck 53 as delivery means (see FIGS. 9 and 10). The truck 53 is provided below the member 15. Consequently, the nose unit 9 is fixed to the car body 1.

When assembling the nose unit 9, the shroud upper 10a and the lower portions of the center stay 10b and shroud side panels 10c are positioned by the member 15. Consequently, the center stay 10b and shroud side panels 10c are normally positioned with respect to the shroud upper 10a with high precision. Accordingly, the various parts such as the radiator and the like are provided in normal positions of a unit base with high precision. Thus, the nose unit 9 can be formed with high precision by the unit base.

In the state where the various parts such as the radiator and the like are normally positioned with high precision, particularly, the lower portions of the center stay 10b and shroud panels 10c are fastened through bolts to the front face of the cross member 7 on the car body 1 side. Consequently, the various parts such as the radiator and the like can be attached to the car body 1 with high precision. Thus, there can be fixed to the car body 1 with high precision the nose unit 9 formed by the unit base including the various parts such as the radiator and the like.

According to the present embodiment, the cross member 7 connecting the front side frames 5 is fixed to the front portion of the car body 1. As shown in FIGS. 11 to 14, the cross member can be incorporated as a unit component on the nose unit side. The basic structure is the same as in the above-mentioned embodiment. Consequently, the same components are represented by the same reference numerals, and their detailed description will be omitted.

On the car body 1 side, extended portions 5a are protruded downward from front side frames 5. Both end portions of a cross member 7A are fastened and fixed between the front side frames 5 by the extended portions 5. Side end portions 7a of the cross member 7A on the nose unit 9A side are fastened to a car body 1 by inserting bolts 41 in holes 5b of the extended portions 9a. The side end portions 7a have nuts welded to their inner faces. In addition, the upper face portion of the cross member 7A is fastened through bolts 42 to the lower face portions of the front side frames 5. The lower face portions of the front side frames 5 have nuts welded to their inner faces. The lower face portion of the cross member 7A has holes 7b for the bolts 42 so as to be fastened to the lower face portions of the front side frames 5.

The cross member 7A is fixed to the lower end portion of a shroud panel 10A, i.e., the lower end portions of a center stay 10e and shroud side panels 10f. The center stay 10e has its upper end portions fixed to a shroud upper 10d. Radiator support brackets 43 are fixed onto the rear side of the cross member 7A. The radiator support brackets 43 serve to support the lower end portion of the radiator 21.

The side end portions of the shroud upper 10d are fastened through bolts 44 to the underside of fastening portions 11c of shroud upper fixing brackets 11A.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A method for assembling a car in which a nose unit having a shroud panel is fixed to a car body, the car body being delivered along a car assembly line and having wheel apron reinforcements, wheel aprons, wheel apron russets and front side frames on its front portion forming an engine room, comprising steps of:
    temporarily attaching to the shroud panel fixing means for fixing the shroud panel to the car body,
    mounting the fixing means on the car body in the state of temporary attachment,
    removing the shroud panel from the fixing means,
    attaching various parts to the shroud panel so as to assemble the nose unit, and
    fastening the shroud panel of the nose unit to the fixing means so as to fix the nose unit to the car body.

2. A method for assembling a car according to claim 1, wherein after mounting the fixing means on the car body, the shroud panel is removed from the fixing means while being positioned by a positioning member.

3. A method for assembling a car according to claim 2, wherein the shroud panel includes a shroud upper having first engagement holes, and a stay which is extended downwardly from the shroud upper and has a second engagement hole,
    the lower portion of the stay is positioned by the positioning member so as to hold a normal position with respect to the shroud upper, and said various parts are attached to the shroud panel.

4. A method for assembling a car according to claim 3, wherein the shroud panel further includes shroud side panels which are provided on both sides of the stay, are vertically extended downwardly from the shroud upper and have third engagement holes, and radiator support brackets are fixed to the lower end portions of the shroud side panels, the radiator support brackets supporting the lower portions of a radiator and a cooler condenser.

5. A method for assembling a car according to claim 4, wherein the positioning member is a rectangular frame having engagement pins on its upper portion and on its lower portion, the upper portion engagement pins being engaged with the first engagement holes of the shroud upper, and the lower portion engagement pins being engaged with the second and third engagement holes on the lower end portions of the stay and shroud side panels.

6. A method for assembling a car according to claim 3, wherein the lower portion of the stay is attached to a member on the car body side after said various parts are attached and positioned by the positioning member.

7. A method for assembling a car according to claim 6, wherein the member on the car body side is a cross member provided between tip end portions of the front side frames.

8. A method for assembling a car according to claim 1, wherein the fixing means includes brackets which are to be welded to the car body, the shroud panel has a shroud upper extended to both sides of the car body, and both end portions of the shroud upper are fastened to the brackets.

9. A method for assembling a car according to claim 8, wherein each bracket includes a base which is to be welded to each wheel apron reinforcement, wheel apron and wheel apron gusset, and an upper fastening portion protruded from the base onto the engine room side.

10. A method for assembling a car according to claim 9, wherein the apron reinforcements have engagement portions on the side of the car body located behind the welding positions of the brackets, with which is engaged a bar for preventing the front portion of the car body from being deformed when fixing the nose unit thereto, and the engagement portions are fixed to the apron reinforcements so as to protrude into the engine room side.

11. A method for assembling a car according to claim 1, wherein the shroud panel include a shroud upper, a stay and shroud side panels, the stay being extended downwardly from the shroud upper, the shroud side panels being provided on both sides of the stay and vertically extended downwardly from the shroud upper,
    a cross member is fixed between the lower end portions of the stay and shroud side panels, the side end portions of the cross member being fastened to the front side frames.

12. A method for assembling a car according to claim 11, wherein radiator support brackets are fixed to the cross member, the radiator support brackets supported the lower portion of a radiator.

13. A method for assembling a car according to claim 1, wherein the car body has a cross member extended to its both sides and provided between the front side frames, and the fixing means is mounted on the car body with the shroud panel temporarily fastened to the cross member.

* * * * *

UNITED STATES PATENT AND TRADEMARK OFFICE
CERTIFICATE OF CORRECTION

PATENT NO. : 5,155,891
DATED : October 20, 1992
INVENTOR(S) : Noboru Yoshii et al.

It is certified that error appears in the above-identified patent and that said Letters Patent is hereby corrected as shown below:

Column 9, Line 23, change "russets" to --gussets--

Column 10, Line 38, change "include" to --includes--

Column 10, Line 50, change "supported" to --supporting--

Signed and Sealed this

Fifth Day of October, 1993

Attest:

BRUCE LEHMAN

*Attesting Officer*   *Commissioner of Patents and Trademarks*